(12) United States Patent
Eckberg

(10) Patent No.: US 7,496,086 B2
(45) Date of Patent: Feb. 24, 2009

(54) TECHNIQUES FOR JITTER BUFFER DELAY MANAGEMENT

(75) Inventor: Adrian Emmanuel Eckberg, Holmdel, NJ (US)

(73) Assignee: Alcatel-Lucent USA inc., Murray Hill, NJ (US)

( * ) Notice: Subject to any disclaimer, the term of this patent is extended or adjusted under 35 U.S.C. 154(b) by 1367 days.

(21) Appl. No.: 10/136,840

(22) Filed: Apr. 30, 2002

(65) Prior Publication Data

US 2003/0202528 A1 Oct. 30, 2003

(51) Int. Cl.
*H04L 12/66* (2006.01)
(52) U.S. Cl. ...................................... 370/352
(58) Field of Classification Search ......... 370/352–356, 370/428, 412–419, 503, 508, 519
See application file for complete search history.

(56) References Cited

U.S. PATENT DOCUMENTS

| | | | | |
|---|---|---|---|---|
| 6,064,676 | A * | 5/2000 | Slattery et al. | 370/412 |
| 6,101,195 | A * | 8/2000 | Lyons et al. | 370/498 |
| 6,370,125 | B1 * | 4/2002 | Belk | 370/312 |
| 2005/0180405 | A1 * | 8/2005 | Bastin | 370/352 |

OTHER PUBLICATIONS

International Engineering Consortium, "Internet Telephony," The International Engineering Consortium, Web ProForum Tutorials, http://www.iec.org, 1-16 (undated).

Unemoto et al., "Voice Synchronization Methods for Burst Rate Coded Voice," NTT Telecommunication Networks Laboratories, IEEE 1879-1884, (1989).

Alvarez-Cuevas et al., "Voice Synchronization in Packet Switching Networks," IEEE Networks Magazine 7, 5, 20-25 (Sep. 1993).

Ramjee et al., "Adaptive Playout Mechanisms for Packetized Audio Application in Wide-Area Networks," IEEE INFOCOM, 680-688 (1994).

Ansari et al., "Compressed Voice in Integrated Services Frame Relay Networks: Voice Synchronization," Proc. Canadian Conference on Electrical and Computer Engineering 1073-1076 (Sep. 1995).

Sanneck et al., "A New Technique for Audio Packet Loss Concealment," Proc. of Global Internet 48-52 (1996).

Schulzrinne et al., "A Transport Protocol for Real-Time Applications," Audio-Video Transport Working Group 1-75 (Jan. 1996).

(Continued)

*Primary Examiner*—Ajit Patel

(57) ABSTRACT

Techniques are provided to allow a jitter buffer to automatically reach a quiescent number of packets in the jitter buffer, based on current network conditions. Generally, no explicit jitter buffer delay is assumed, and a current packet is repeat played if no new packets are available in the jitter buffer. If there are too many packets in the jitter buffer, a newly received packet is discarded. When a packet is replayed, the delay associated with a jitter buffer is effectively increased. This is not an explicit jitter buffer delay, but, instead, there is an implicit delay associated with the jitter buffer. When a packet is discarded, the delay associated with a jitter buffer is effectively decreased. Again, this is an implicit jitter buffer delay. By repeat playing packets and discarding packets when the jitter buffer is full, an appropriate level of packets may be determined and maintained in the jitter buffer.

11 Claims, 9 Drawing Sheets

OTHER PUBLICATIONS

ITU-T Recommendation G.114, "One-Way Transmission Time," 1-12 (Feb. 1996).

Shenker et al., "General Characterization Parameters for Integrated Service Network Elements," RFC 2215, Internet Engineering Task Force 1-15 (Sep. 1997).

Perkins et al., "A Survey of Packet Loss Recovery Techniques for Streaming Audio," IEEE Network Magazine, 40-48 (Sep./Oct. 1998).

Yuval Boger, "Fine-tuning Voice over Packet Services," Radcom Ltd., 1-20, (1998).

Moon et al., "Packet Audio Playout Delay Adjustment: Performance Bounds and Algorithms," Department of Computer Systems, University of Massachusetts at Amherst, 1-35 (1998).

Telogy Networks, "Voice over IP (VoIP)," The Technology Guide Series techguide.com, The Applied Technologies Group, Inc., 1-44 (1998).

Tien et al., "Intelligent Voice Smoother for VBR Voice over ATM Networks," Proc. INFOCOM, 841-848 (1998).

Kuo et al., "Delivering Voice over the Internet," Proc. NCS, Workshop on Computer Network, 628-632 (1999).

Tien et al., "Intelligent Voice Smoother for Silence-Suppressed Voice over Internet," IEEE Journal on Selected Areas in Communications, vol. 17, No. 1, 1764-1768 (Jan. 1999).

Binglin Li, "Telephonic Applications on Internet," Department of Math and Computer Science, Kent State University,1-17 (May 1999).

Rosenberg et al., "Integrating Packet FEC into Adaptive Voice Playout Buffer Algorithms on the Internet," INFOCOM,1-10 (2000).

Texas Instruments, "Voice and Fax over Internet Protocol (V/FoIP)," The International Engineering Consortium, Web ProForum Tutorials, http://www.iec.org, 1-30 (Jan. 12, 2000).

ITU-T Recommendation G.107, "The E-Model, a Computational Model for Use in Transmission Planning," 1-16 (May 2000).

W. E. Witowsky, Texas Instruments, "Carrier-Class High Density Voice over Packet (VoP) Gateways," The International Engineering Consortium, Web ProForum Tutorials, http://www.iec.org, 1-22 (Jan. 2001).

Liao et al., "Adaptive Recovery Techniques for Real-Time Audio Streams," Proc. of IEEE INFOCOM, 815-823 (Apr. 2001).

Liang et al., "Adaptive Playout Scheduling Using Time-Scale Modification in Packet Voice Communications," IEEE International Conference on Acoustics, Speech 1445-1448 (May 2001).

TERAbridge, "Voice Telephony over Asynchronous Transfer Mode (VToA)," The International Engineering Consortium, Web ProForum Tutorials, http://www.iec.org, 1-17 (Jul. 6, 2001).

Cisco IOS Release 12.1(5)T, "Playout Delay Enhancements for Voice over IP," 1-20 (Oct. 29, 2001). "Voice Over Frame/IP," downloaded from http://home.att.net/~mcraycraft/wp.html on Dec. 17, 2001.

"Voice Over Frame/IP," downloaded from http://home.att.net/~mcraycraft/wp.html on Dec. 17, 2001.

"Voice over IP and IP Telephony: References," downloaded from http://www.cis.ohio-state.edu/%7ejain/refs/ref_voip.htm on Dec. 18, 2001.

S. Pracht and D. Hardman, Agilent Technologies, "Voice Quality (VQ) in Converging Telephony and IP Networks," The International Engineering Consortium, Web ProForum Tutorials, http://www.iec.org, 1-30, (2001).

Gil Biran, "Voice over Frame Relay, IP and ATM," RAD Data Communications Ltd., downloaded from http://www.protocols.com/papers/voe.htm on Jan. 8, 2002.

"Voice over Internet Protocol (VoIP)," downloaded from http://www.whipper.uwc.ac.za/~tpaulse/Masters/Summaries/voip.htm on Jan. 8, 2002.

* cited by examiner

TECHNIQUES FOR JITTER BUFFER DELAY MANAGEMENT

FIELD OF THE INVENTION

The present invention relates generally to buffers used to reduce jitter produced in packet networks, and more particularly, to techniques for jitter buffer delay management.

BACKGROUND OF THE INVENTION

In some applications, a "jitter buffer" is used to recreate a constant stream of information from a flow of packets carrying that information. The "jitter" in this stream occurs because the packets are delivered irregularly to a destination. In other words, packets that are generated every T milliseconds, for example, should ideally be delivered to the destination every T milliseconds. However, many networks, such as the Internet, cause asynchronous delivery of packets, with each successive packet typically experiencing a different end-to-end delay. Jitter buffers are used in these instances to reduce the likelihood that a gap is present in the stream of recreated information, due to the packet carrying the information that otherwise would have filled that gap having been delayed in the network. Jitter buffers typically perform this function by waiting a predetermined delay, called the "jitter buffer delay," before "playing out" the first received packet. The jitter buffer delay allows time for succeeding packets to be received before preceding packets are played out. However, jitter buffer delay introduces its own problems, particularly in systems that are transmitting voice signals.

A need therefore exists for techniques that allow jitter buffer delays to be managed in such a way as to reduce jitter buffer delay yet still provide adequate voice quality.

SUMMARY OF THE INVENTION

Generally, the present invention provides techniques for jitter buffer delay management. These techniques are particularly suitable for handling voice packets in packet switching networks, but may be used for any data that is delivered asynchronously, yet needs to be converted to a synchronous stream for playout.

Broadly, the present invention provides techniques to allow a jitter buffer to automatically reach a quiescent number of packets in the jitter buffer, based on current network conditions. Instead of providing a predetermined, explicit jitter buffer delay, generally no explicit jitter buffer delay is assumed, and the broad aspects of the present invention simply repeat the playing of a current packet if no new packets are available in the jitter buffer. If there are too many packets in the jitter buffer, a newly received packet is discarded. This is not an explicitly specified/targeted jitter buffer delay, but, instead, there is an implicit delay associated with the jitter buffer. When a packet is replayed, the implicit delay associated with the jitter buffer is effectively increased. Similarly, when a packet is discarded, the implicit delay associated with the jitter buffer is effectively decreased. Again, this is an implicit jitter buffer delay. By repeat-playing packets when the jitter buffer is empty and discarding packets when the jitter buffer is full, an appropriate level of packets may be determined and maintained in the jitter buffer, without the need for complex explicit jitter buffer delay determinations or a fixed explicit jitter buffer delay.

Additional aspects of the present invention allow a number of values to be set, which allows better management of the jitter buffer and provides better automatic jitter buffer delay determination. Three important values in an embodiment are (i) a buffer limit value, which indicates a maximum number of packets allowed in the jitter buffer, (ii) a replay value, which indicates a maximum number of times a particular packet is allowed to be replayed, and (iii) a repeat play value, which indicates a buffer level (i.e., a number of packets currently in the buffer) above which replaying of packets is disallowed. Based on these values, decisions can be made as to whether (i) a packet from the jitter buffer should be played, (ii) a previously played packet should be replayed, (iii) a packet from the jitter buffer should be discarded, (iv) another packet should be selected, or (v) a waiting period should occur to allow another packet to be received.

Moreover, even more aspects of the invention provide a minimum delay for the jitter buffer.

A more complete understanding of the present invention, as well as further features and advantages of the present invention, will be obtained by reference to the following detailed description and drawings.

DETAILED DESCRIPTION

Figure 1:
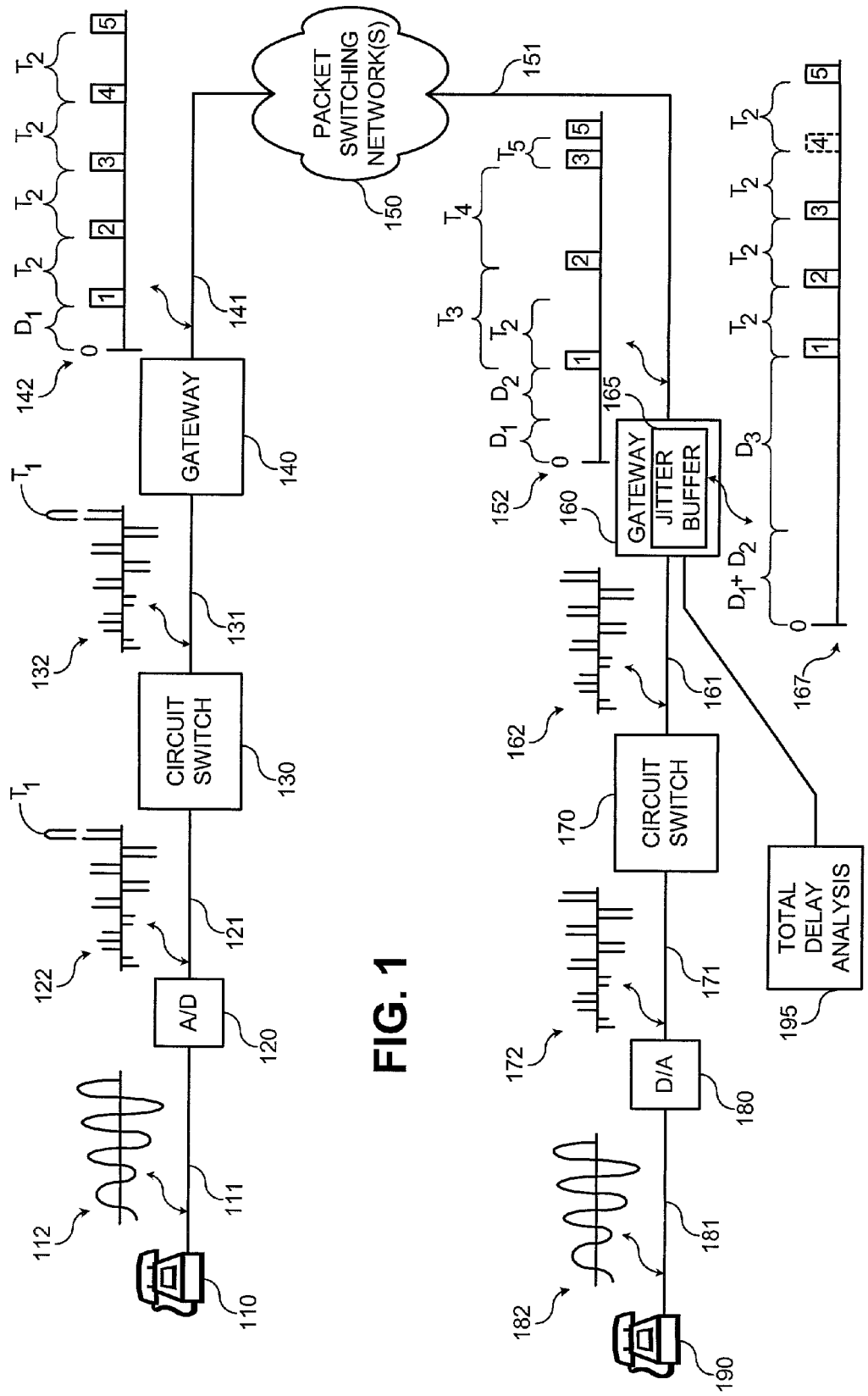
FIG. 1 is a block diagram of an example of a communication between two telephones through a packet switching network.

The present invention provides techniques for jitter buffer delay management. In conventional packet switching systems that carry voice packets (commonly called "Voice Over Packet" or VOP systems), an explicit jitter buffer delay is set to some initial, and generally high value. Alternatively, complex methods are used to determine an explicit jitter buffer delay value, which is then used until the complex method is performed again and the explicit jitter buffer delay value is updated. Problems with these schemes include having an explicit jitter buffer delay that is too large or too small. The jitter buffer delay value determination may be performed infrequently, with the result that the determined value is out-of-date much of the time. And, the jitter buffer delay value determination may be performed too frequently, with the result that an undue burden is placed on the overall system for these determinations, and the determined values themselves may be inaccurate, due to the small size of sample data on which they are based. In order to understand these problems, a detailed analysis of common jitter buffer uses and techniques will now be given.

In many conventional telephone systems, a connection is made from an originating telephone to a destination telephone. The originating telephone connects to an originating Local Exchange Carrier (LEC). This LEC generally owns the access line to the originating telephone, a local switch, and a local network. The local switch connects the originating telephone to the local network. There is usually another LEC associated with the destination telephone and its access line. In a "local" call, these LECs would generally be the same. For a typical "long distance" call, the two LECs must have their networks connected via switches owned by an Inter-Exchange Carrier (IEC). In today's telecommunication environment, this connection can be much more complicated, but this picture of originating LEC to IEC to destination LEC is still a dominant one.

The dominant switching technology in use today for voice connections is circuit switching, and in this case the circuit used to connect the two LECs is dedicated. Circuit switched voice really involves dedicated resources that are assigned to, and used only by, a given voice connection. Even if neither party is talking, so there are no voice signals to transport, these dedicated resources cannot be used by any other voice call. The dedicated resources include transmission channels on links, and connections through circuit switches. Voice signals are guaranteed to arrive at the destination as long as the dedicated circuit exists.

New technology has caused a shift from sending voice signals over purely circuit switching systems to sending these voice signals over information transport arrangements that involve one or more packet switching systems. If transport of the voice signals is via a packet switching system, the system will periodically "package" some segments of the voice signal into packets. There are many options for performing this packaging of segments of the voice signal, but a common technique is to package successive equal-duration signal segments (e.g., 10 millisecond segments) into successive packets to be sent through the packet network. The actual form of the packets depends on the type of system being used. For example, a packet used in a system that supports Asynchronous Transfer Mode (ATM) will be quite a bit different from a packet used in a system that supports an Internet Protocol (IP).

In a packet switching network, there are no dedicated network resources for the voice packets associated with a given voice call. Rather, packet switching is based on the concept of "statistically sharing" network resources. Contrary to the synchronous operations (i.e., according to a predetermined schedule) of transporting information via circuit switching, the operations of information transport via packet switching tend to be asynchronous. That is, each step in the passage of a packet across the network involves requesting a key resource, waiting for the resource to be made available for use by this packet, utilizing the resource to complete the step, and finally relinquishing the resource so that it can be used by another packet. Thus, the steps in the passage of a given packet are not performed according to a predetermined schedule. In fact, depending on the packet network congestion level, a packet may experience considerable and unpredictable delay in completing these individual steps and in the overall passage across the network.

Because, after their passage across the packet switching network, a stream of packets must be converted back into a synchronous voice signal, care must be taken in determining when each packet in the stream is allowed to be played out. This is because the transit delays of successive voice packets across the network will all typically be different. In fact, in some networks packets may even arrive at the destination out of order. To alleviate problems associated with some packets arriving late relative to others (i.e., some packets experiencing excessively long transit delays), a buffer should be used at the destination, where arriving packets can wait until they are played out at regular, synchronous instants.

FIG. 1 helps to explain how packets arrive at a destination and why buffering is used at the destination. FIG. 1 shows a communication between two telephones. For this example, the communication between telephones 110 and 190 will be examined by describing how a voice signal originates at origination telephone 110, then is routed through various networks, and is finally reconstructed at destination telephone 190.

Originating telephone 110 generates an analog signal 112 through analog lines 111. The analog voice signal 112 is converted, through Analog to Digital (A/D) converter 120, to a digital, synchronous voice signal, which is illustrated by reference 122. To create the digital samples, A/D converter 120 periodically samples the analog voice signal 112 and quantizes the sample into a number of bits. The period is illustrated as $T_1$. This period is generally 125 microseconds, which gives 8,000 samples per second, and eight bits per sample are generally used. However, other schemes may be used. The relative values of these samples are illustrated in digital, synchronous voice signal 122. A/D converter 122 then routes the synchronous voice signal 122 to circuit switch 130 through a connection 121.

Circuit switch 130 creates a dedicated circuit 131 to gateway 140. This dedicated circuit is such that synchronous voice signal 132 is transmitted over the dedicated circuit 131 in a time-multiplexed fashion. However, the resources used to support this dedicated circuit 131 cannot be used by any other call. For instance, a "resource" could be a particular timeslot and data capacity during and over which data from the synchronous voice signal 132 is transmitted. This particular timeslot and capacity cannot be used by any other call. In the example of FIG. 1, the synchronous voice signal 122 has 8,000 samples per second, one every 125 microseconds, and each sample has eight bits. One possible way to create a dedicated circuit 131 with this signal is to send eight bits every 125 microseconds over a connection between circuit switch 130 and gateway 140. This is illustrated by synchronous voice signal 132.

It should be noted that A/D converter 120 might be at a variety of different positions. A digital telephone, such as an Integrated Services Digital Network (ISDN) telephone, will convert analog to digital and vice versa directly in the telephone itself. In other configurations, an analog telephone line will terminate in a line card, on a circuit switch, that contains an A/D converter. Additionally, it is possible for circuit switch 130 to be an analog circuit switch, so that the A/D conversion takes place after circuit switch 130 but before or in gateway 140.

Gateway 140 is a device that converts synchronous signals to an asynchronous means for transmitting these signals. A synchronous signal is a signal that operates according to a predetermined schedule. A synchronous signal may be transmitted synchronously, in which case the signal maintains this schedule throughout transmission; or it may be transmitted asynchronously, i.e., broken into segments that are sent independently, and that need not arrive at a predetermined schedule. Thus, gateway 140 is a device that is an intermediary between a circuit switched network and a packet switched network. Gateway 140 packages a number of samples from synchronous voice signal 132 into a packet. Packets created in this manner are illustrated as packets 1 through 5 of "asynchronous" voice signal 142. Gateway 140 generally uses a time period, denoted as $T_2$, in which synchronous voice signal 132 samples are collected and then packaged into a packet. Time period $T_2$ is generally on the order of 10 to 50 milliseconds. For a time period $T_2$ of 10 milliseconds, a packet would usually contain 80 samples, each sample having eight bits, for a total of 640 bits or 80 bytes. It should be noted that, although FIG. 1 shows a periodic packaging of voice data, there is no requirement to package data in this manner. For instance, packet 1 could be created after time period $T_2$, while packet 2 could be created after a time period that is not equal to time period $T_2$.

In addition to samples of voice data, each packet 1 through 5 of asynchronous voice signal 142 would contain some type of information that will be used, when the packets are received, to re-order the packets correctly, and/or to detect instances where a particular packet never arrives, because it has been dropped in the packet network. This information could simply be sequence numbers that indicate the relative order in which packets were created. Generally, however, timestamps are used to accurately mark the time each packet was created. The use and creation of timestamps for Internet applications are described in Schulzrinne, et al., "RTP: A Transport Protocol for Real-Time Applications, a Request for Comments 1889," the Network Working Group division of the Internet Engineering Task Force (1996), the disclosure of which is hereby incorporated by reference. Any technique for reconstructing the order of packets may be used.

Delay $D_1$ is a delay caused by delays in A/D converter 120, circuit switch 130, gateway 140, and any travel delays from telephone 110 to network connection 141. The most time consuming delay will usually be caused by gateway 140, because the gateway 140 must wait until it stores enough samples to create a packet. For instance, in the example given above, time period $T_2$ is 10 milliseconds. The gateway 140 must wait at least 10 milliseconds to capture enough samples to create a packet, and there will be some amount of time to create the packet and to transmit the packet, although the time to create and transmit a packet is usually small relative to time period $T_2$. Consequently, $D_1$ is approximately equal to $T_2$ in most cases.

Gateway 140 transmits the packets of the asynchronous voice signal 142 over network connection 141 and through a packet switching network or networks 150. In a packet switching network, there is usually no guarantee that a packet will be given priority through the network or that a packet will actually arrive at a destination. Therefore, when packets 1-5 are transmitted through the packet switching network 150, they may or may not arrive at network connection 151. Moreover, they will generally arrive at times that are asynchronous relative to the arrival of other packets. This is shown in asynchronous voice signal 152, where packet 1 arrives at a time of $D_1+D_2$, but packet 2 arrives at time $D_1+D_2+T_3$. Ideally, each packet should arrive at time $T_2$ from another packet, and each packet should arrive in the order in which it was packaged and sent. This is not the case in the example, as time period $T_3$ is greater than time period $T_2$ (as shown in FIG. 1). Moreover, the time between the arrival of packet 2 and packet 3 is time period $T_4$, which is greater than $T_2$, but time period $T_5$ is less than $T_2$ even though packet 5 is received shortly after packet 3 is received.

This variability in packet arrival is known as jitter. One definition for the term jitter is given in "Playout Delay Enhancements for Voice over IP," Cisco IOS Release 12.1 (5)T (October 2001), the disclosure of which is hereby incorporated by reference, where it states, "Jitter . . . is defined as the difference between when a packet is expected to arrive and when it actually is received."

The asynchronous voice signal 152 also shows delay $D_2$, which is a delay, experienced by packet 1, caused by travel through network 150. The total delay, experienced by packet 1, before gateway 160 is then $D_1+D_2$. This delay is discussed in more detail below.

Because of the variability in arrival of packets, most gateways contain a jitter buffer 165. The jitter buffer 165 attempts to recreate the ordered, synchronous voice signal 132 by determining the order of packets 1 through 5 and playing the packets out at periodic times and in order. Ideally, the jitter buffer 165 would exactly recreate asynchronous signal 142 and play out each packet in order to exactly recreate voice signal 132. However, the actual synchronous voice signal 162 that is recreated will generally be different from the original synchronous voice signal 132 for reasons discussed below.

First, because of the delays incurred in creating the packets and transporting the packets across the network, it will be impossible for signal 162 to exactly equal signal 132. The best that can be expected is for signal 162 to equal a delayed version of signal 132. A goal of the jitter buffer may be considered to be to arrange for signal 162 to exactly equal a delayed version of signal 132, where the amount of delay is some "reasonable" quantity. Sometimes this is possible, and sometimes it is not, as is elaborated below.

In order to recreate the packet order and properly play packets out, most jitter buffers will wait an explicitly specified jitter buffer delay, shown as $D_3$ in asynchronous voice signal 167. This explicit jitter buffer delay $D_3$ allows the jitter buffer 165 to have at least one packet, if not several packets, arrive before playout of packets begins. This also allows the jitter buffer 165 to put the packets back in proper order, should the packets arrive out of order. The utility of the explicit jitter buffer delay $D_3$ is shown by asynchronous voice signal 152: If the jitter buffer were to immediately play out packet 1, then packet 2 would not have arrived in time to be played out. Consequently, explicit jitter buffer delay $D_3$ helps by providing more time during which other packets can arrive. In the example of asynchronous voice signal 167, the explicit jitter buffer delay $D_3$ allows the jitter buffer 165 to come close to recreating (a reasonably delayed version of) asynchronous voice signal 142. The jitter buffer 165 plays out each packet to create synchronous voice signal 162 on dedicated circuit 161. Circuit switch 170 then switches the voice signal 162 to the correct connection 171 as synchronous voice signal 172. Digital-to-Analog (D/A) converter 180 converts synchronous voice signal 172 to analog voice signal 182, which is then played by telephone 190.

The jitter buffer 165 and gateway 160 operate to convert the asynchronous packets in asynchronous voice signal 167 to the synchronous voice signal 162. In the example of FIG. 1, the synchronous voice signal 162 initially is the same as synchronous voice signal 132 (except for the delay $D_1+D_2+D_3$). However, packet 4 is missing, which will cause some type of error in synchronous voice signal 162 as compared to synchronous voice signal 132. There are a variety of techniques for dealing with a missing packet. Some techniques will simply play random noise, while others will wait until a new packet comes in before playing anything. A problem with these techniques is that noise or silence may be noticeable. Another technique is interpolation, where packets 3 and 5 are used to estimate the data for missing packet 4. The problem with interpolation is that it can be quite complex and demanding of considerable signal processing power.

Yet another technique is replaying the previous packet, such as packet 3, when a packet is missing. It is assumed herein that replaying previous voice packets is approximately as good as interpolation, for most listeners, and will not detract from a telephone conversation for most people.

Asynchronous voice signal 167 also shows another important criteria in telephone calls, which is the total delay $D_1+D_2+D_3$. This total delay, which is the "delay difference" by which synchronous signal 162 will differ from synchronous signal 132, is often referred to as "voice latency." In tests, scientists have found that a total delay, from a source to a destination, of 150 milliseconds or less is generally not noticeable for most people. See, for instance, FIG. 3 of "Voice Quality (VQ) in Converging Telephony and IP Networks," the Int'l Engineering Consortium (January 2002), and FIG. B3 of "General Characteristics of International Telephone Connections and International Telephone Circuits," ITU-T Rec. G.114, Int'l Telecommunication Union (1996), the disclosures of which are hereby incorporated by reference. Since these tests involved "subjective" opinions of voice quality, it is difficult to make accurate statements on a per-person basis. However, total delay begins to be noticeable/bothersome around 150 ms, while total delays below 150 ms do not unduly detract from perceived voice quality for most people. Also, it should be obvious that there would be no perceived difference between a 149 ms total delay and a 151 ms total delay, so a "150 ms target total delay" is really a theoretical objective. It is generally accepted that, if the voice total delay stays below this target, a conversation will tend to yield toll quality; however, there are probably some very discriminating people for whom 150 ms is not small enough. For total delays larger than 150 ms but smaller than 400 ms, most people begin to be bothered; however, a very small population can tolerate delays as large as 400 ms. Total delays higher than 400 ms are considered unacceptable by almost all subjects. In summary, for toll quality telephone conversations, industry standards state that the total delay should kept to less than 150 ms.

The selection of an appropriate explicit jitter buffer delay value, $D_3$, involves a basic tradeoff, which may be described qualitatively as follows. The larger the value of $D_3$ is, the greater will be the likelihood that any given packet, e.g., packet k, will have arrived and will be waiting in the jitter buffer by the time that packet is scheduled to be played out. In fact, if there are no packet losses within the packet network, using a very large value for $D_3$ will virtually guarantee that every packet can be played out in its correct order. However, the larger $D_3$ is, the larger will be the total delay, $D_1+D_2+D_3$. Eventually, the total delay may become dangerously close to, or exceed, the 150 ms industry-accepted standard. Also, as $D_3$ is made larger, the jitter buffer itself must be made to accommodate a greater number of packets, which will eventually have an impact on the economics of implementing the jitter buffer.

In an effort to maintain toll quality (which is affected by both the total delay and the fraction of packets that do not arrive by their scheduled playout time), many jitter buffer delay management schemes have complex algorithms to determine an appropriate explicit jitter buffer delay value, $D_3$. These approaches separate the estimation and determination of the explicit jitter buffer delay value from the application of the explicit jitter buffer delay.

Usually, the determined explicit jitter buffer delay value is applied to the first received packet, and this will establish the average jitter buffer delay experienced by successive packets throughout the voice call. This assumes that there is a continuous generation of voice packets, throughout the duration of the call, at the source gateway, and if any packets are lost in the network, the loss will be detected and the "gap" left by that lost packet will be filled in by one of the techniques mentioned above. Thus, normally, the average jitter buffer delay would be expected to "hover" around its nominal value. However, due to possible differences in the clock rates in the devices used to create the packets and to play the packets out, it is possible in some instances that the rate of playing out information (i.e., bits) may be larger or smaller than the original rate of the information. In such instances, the average jitter buffer delay will gradually "drift" either higher or lower than it was originally intended to be. Therefore, many gateway devices will continuously monitor the jitter buffer delay, averaged over a recent set of packets, and if this delay has drifted in an average sense too high or too low, some corrective action will be taken to bring the average jitter buffer delay back in line with the explicit jitter buffer delay value determined via the study.

Still other VOP methods employ a technique called "silence suppression," in which successive periods of talking (so-called "talk-spurts"), interspersed with silence periods, are processed at the source gateway in such a way that voice packets are generated and sent only for the portions of the voice signal corresponding to talk-spurts. That is, no packets are sent during silence periods; i.e., silences are "suppressed." For such VOP systems, the determined explicit jitter buffer delay value is applied to the first received packet of each talk-spurt, and this will establish the average jitter buffer delay experienced by successive packets throughout the talk-spurt. In VOP systems with silence suppression, it is possible for a different explicit jitter buffer delay value to be applied at the start of each new talk-spurt, if a method is provided for rapidly determining new explicit jitter buffer delay values. Also, in VOP systems with silence suppression, it is even possible to monitor the average jitter buffer delay within each talk-spurt, and to take corrective actions within the talk-spurt so that this averaged jitter buffer delay will closely track the explicit jitter buffer delay value.

Thus, jitter buffer delay management usually entails an explicit operation of determining the "best" jitter buffer delay value, an operation of applying the determined jitter buffer delay value to the first packet (in the voice call, or in a talk-spurt, depending on whether silence suppression is used), as well as (possibly) an explicit operation of applying corrective actions to the jitter buffer contents to keep the average jitter buffer delay "close" to the predetermined value.

For instance, a total packet delay analysis 195 is usually performed by these approaches. This total delay analysis could be separate from the gateway 160 (as shown in FIG. 1) or could be part of gateway 160. The most typical approach used in a total packet delay analysis 195 is to perform a study of the network (e.g., a network from gateway 140 to gateway 160) and its delays so that a statistical characterization of the total delay (and of the jitter) can be obtained. This often is an "off-line" study, which means that it is done over a quite lengthy time interval in order to obtain good statistical reliability in the jitter and delay characterization. Also, the study usually involves techniques that statistically sample cross-network packet delays, or maybe related quantities. Through such an off-line study, which might take days or weeks, an explicit jitter buffer delay value (i.e., $D_3$) is determined. Such an explicit jitter buffer delay value might result from the estimated ninety-fifth percentile of the cross-network delay minus the minimum possible cross-network delay. This explicit jitter buffer delay value is then usually "administratively provisioned" into the software for gateway 160, so that this explicit jitter buffer delay value is always used.

In more advanced VOP approaches that have been described in the literature, the techniques for determining the explicit jitter buffer delay value can be theoretically sped up so that this determination can be performed quite frequently. This allows new explicit jitter buffer delay values to be determined and applied within the duration of a voice call, e.g., for each new talk-spurt, in the case of a system employing silence suppression. However, these techniques for explicit jitter buffer delay value determination build off of the "off-line" techniques described above. And, in all of these techniques, the jitter buffer delay management approach continues to be based on the following "separation principle:" first determine an explicit jitter buffer delay value, then apply that explicit value to the jitter buffer. The following references illustrate some of these approaches to jitter buffer delay management: Liang et al., "Adaptive Playout Scheduling Using Time-Scale Modification in Packet Voice Communications," Proc. of Int'l Conf. on Acoustics, Speech, and Signal Processing, Salt Lake City, Utah (May 2001); Alvares-Cuevas et al., "Voice Synchronization in Packet Switching Networks," IEEE Networks, 7(5):20-25 (1993); Moon et al., "Packet Audio Playout Delay Adjustment: Performance Bounds and Algorithms," ACM/Springer Multimedia Systems, Vol. 6, pp. 17-28 (1998); and Ramjee et al., "Adaptive Playout Mechanisms for Packetized Audio Applications in Wide-Area Networks," IEEE INFOCOM, Toronto, Canada (1994), the disclosures of which are hereby incorporated by reference.

Figure 2:
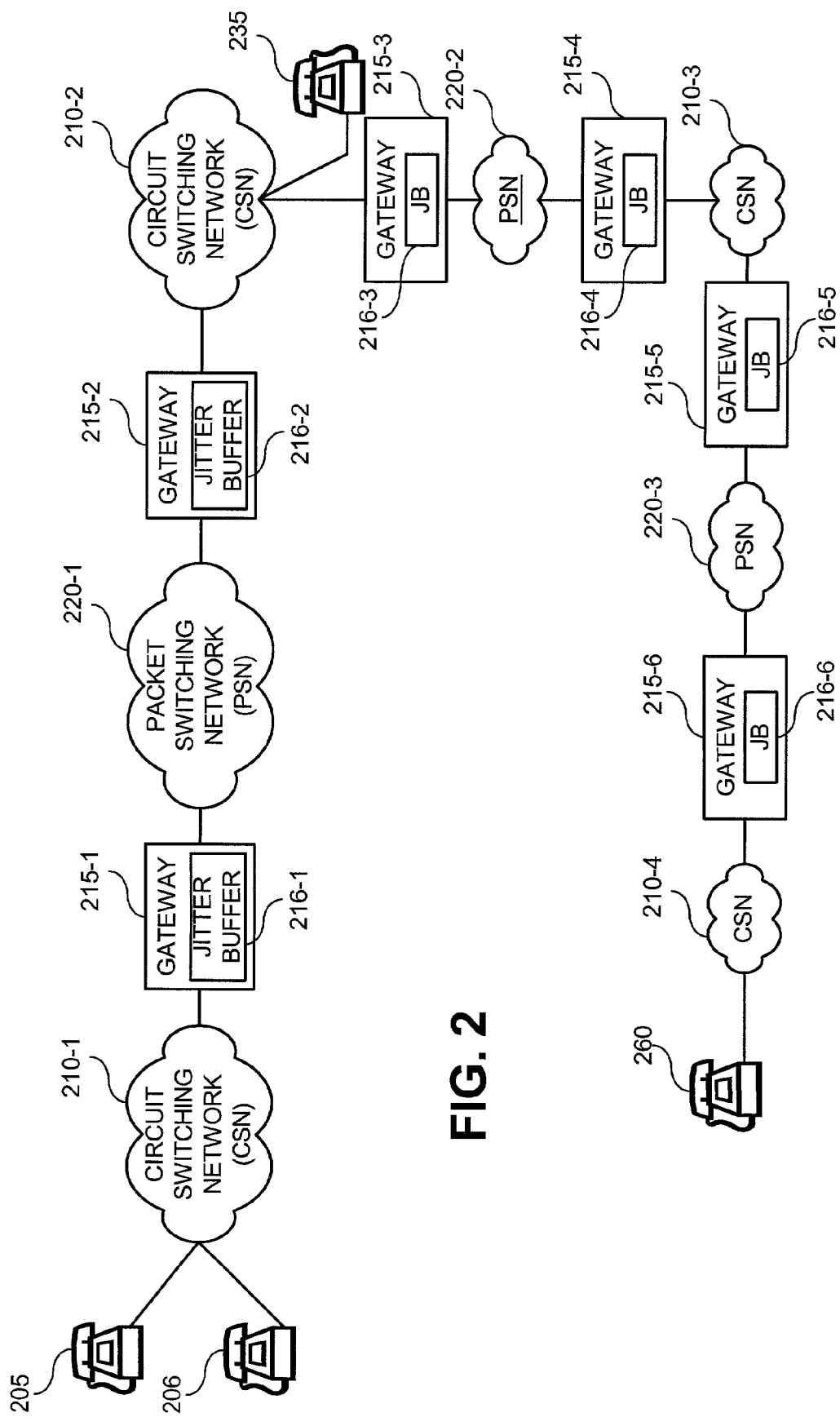
FIG. 2 is a block diagram of a telephone network useful for explaining problems with conventional jitter buffer delay techniques and benefits of aspects of the present invention.

FIG. 2 shows a situation where jitter buffer delay is very important. In FIG. 2, there are two communications occurring: the first is between telephone 205 and telephone 225, and the second is between telephone 206 and 260. Voice signals traveling between telephone 205 and telephone 235 travel through circuit switching network 210-1 (e.g., comprising an A/D converter and a circuit switch), gateway 215-1, packet switching network 220-1, gateway 215-2, and circuit switching network 210-2. Jitter buffer 216-2 operates to handle voice signals from telephone 205, while jitter buffer 216-1 operates to handle voice signals from telephone 235. Each jitter buffer 216 generally has an explicit jitter buffer delay associated with it. When voice signals travel between telephones 205 and 235, the amount of explicit jitter buffer delay in jitter buffers 216-1 and 216-2 is important to maintain toll quality telephone calls. However, even relatively large fixed values of explicit jitter buffer delay will likely be less than 150 ms (ms).

A problem occurs for a telephone conversation between telephones 206 and 260. In this situation, there are an additional two packet switching networks 220-2 and 220-3, two more circuit switching networks 210-3 and 210-4, and four more gateways 215-3, 215-4, 215-5, and 215-6. As before, each gateway 215 comprises a jitter buffer 216. Jitter buffer 216-6 operates to handle voice signals from telephone 206 while jitter buffer 216-1 operates to handle voice signals from telephone 260. In this situation, even a small amount of explicit jitter buffer delay for each jitter buffer 216 can cause the total delay from telephone 206 to telephone 260 (or vice versa) be greater than 150 ms. For instance, an explicit jitter buffer delay of 50 ms for each jitter buffer 216-2, 216-4, and 216-6 will result in a total end-to-end delay of at least 150 ms, plus the combined times for packetization in these three networks (3 times 10 ms=30 ms), or approximately 180 ms, for voice signals originating at telephone 206 and ending at telephone 260.

In today's telecommunication environment, in which there are multiple service providers, the situation described above in which there are multiple packet networks involved in the end-to-end voice connection, is likely to occur quite frequently. The above example is for three packet networks, but other realistic examples can be constructed in which there are as many as five or more packet networks. For such connections, it will be essential for the total end-to-end network delay, for each of the packet networks involved, to be reduced to its absolutely smallest possible value, which will require that each jitter buffer delay for each network be made as small as possible. This, in turn implies, that fast, dynamic techniques for adapting each jitter buffer delay to its smallest possible value may become essential in order to deliver toll quality voice. While such techniques have been proposed, and in fact some gateway devices purport to implement fairly fast-acting adaptive schemes, such techniques tend to add considerable cost to the gateways, and most jitter buffer delay adaptation approaches today are much more slowly acting.

By contrast, the present invention provides techniques for automatically adjusting the amount of jitter buffer delay, which should automatically determine an appropriate jitter buffer delay given current network conditions. Broadly, the present invention works by managing an implicit and not explicit jitter buffer delay. Basically, one embodiment of the present invention starts by having no explicit jitter buffer delay. If a voice packet is played out and the jitter buffer is empty after packet playout, the playout of the packet is repeated. As described above, it is assumed herein that repeat playing of voice packets is not detrimental to a communication between two people if the number of times a single packet is repeated is relatively small and not many packets are repeated. Repeat playback of packets implicitly causes an increase in jitter buffer delay. Similarly, when a packet is discarded, there is an implicit decrease in jitter buffer delay. The techniques of the present invention are adaptive yet do not take long amounts of adjustment time and adjustment complexity. Moreover, the adaptive techniques of the present invention do not focus on the adaptive determination of an explicit jitter buffer delay per se; rather, the present invention focuses directly on adaptively managing the jitter buffer contents, with a side-effect being that the jitter buffer delay is also impacted.

Usually, the implicit jitter buffer delay of the present invention is increased or decreased by whole values of a time to play out a single packet. In other words, if each packet contains 10 ms of voice data, then repeat playing a packet increases the implicit jitter buffer delay by 10 ms, while discarding a packet will decrease the implicit jitter buffer delay by 10 ms. The present invention creates conditions such that this implicit jitter buffer delay is increased, is decreased, or is held steady. Additionally, by modifying certain values, it is possible to inhibit how fast the implicit jitter buffer delay increases.

There are systems when it can be beneficial to use a predetermined explicit jitter buffer delay. Consequently, it is possible to use a predetermined explicit jitter buffer delay with aspects of the present invention. However, the present invention will still allow an implicit jitter buffer delay to be modified through modification of the number of voice packets in the jitter buffer, and this is in addition to the predetermined explicit jitter buffer delay.

In the following, the term "packet" is used generically. A packet is a unit of data that is routed between an origin and a destination on the Internet or any other packet-switched network. The term "packet" may be substituted by the terms "cell," "frame," or any other term that generically means the same as "packet." A packet switching network is a network in which packets are routed through the network based on a destination address contained within each packet. There is no dedicated communication circuit or path for the packets. By contrast, a circuit switching network develops a dedicated communication circuit or path for a communication.

Figure 3:
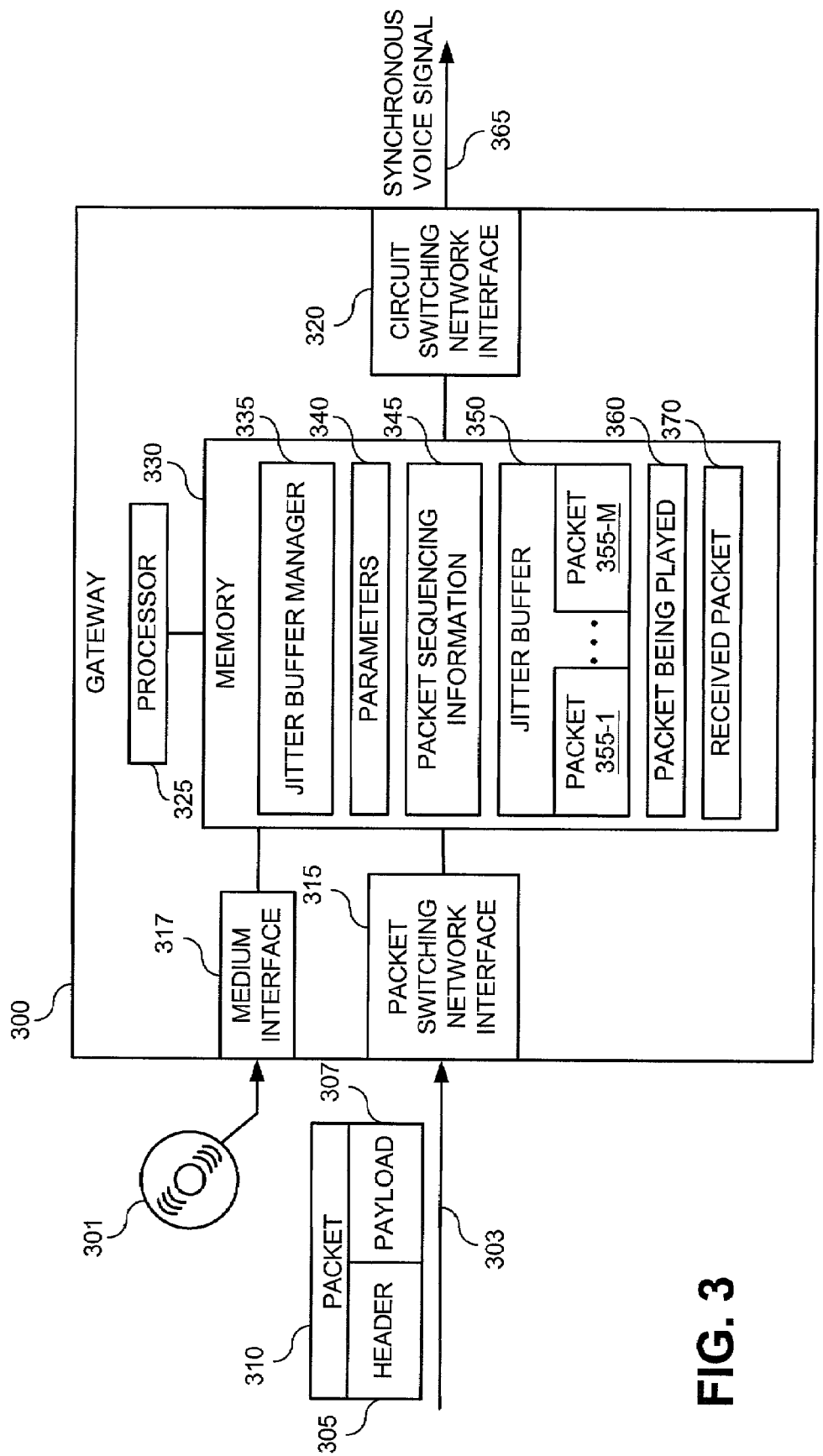
FIG. 3 is block diagram of a gateway that uses the jitter buffer delay management techniques, in accordance with a preferred embodiment of the invention.

FIG. 3 is block diagram of a gateway 300, shown operating in accordance with a preferred embodiment of the invention. The gateway 300 is shown interoperating with a Digital Versatile Disk (DVD) 301 and packet switching network 303, and producing a synchronous voice signal 365 (i.e., as a connection to a circuit switching network).

Gateway 300 in this example comprises a medium interface 317, a packet switching network interface 315, a processor 325, a memory 330, and a circuit switching network interface 320. Packet switching network interface 315 receives packet 310, which comprises a header portion 305 and a payload portion 307, and which is routed to memory 330 as received packet 370. Received packet 370 can be exactly the same as packet 310, or could have all but the payload 307 and timestamp (e.g., in header 305) removed. Memory 330 comprises a jitter buffer manager 335, parameters 340, packet sequencing information 345, a jitter buffer 350, and a packet being played memory area 360. Jitter buffer 350 comprises M packets, packets 355-1 through 355-M.

In the following discussion, reference is made to the terms "packet header" and "packet payload." These terms are used generically, in the following sense. Generally, "packet payload" refers to the totality of the useful data that is being transported via a packet. For the case of a "voice packet," the packet payload would thus be the set of voice samples, or some other data conveying the voice signal segment that is being transported. Also, generally, "packet header" refers to the remaining contents of the packet, exclusive of the "payload," i.e. the totality of control information that is contained in the packet. In today's packet technology, it is common for a system of "nested" protocols to be used, with each defined protocol unit having its own formally defined header and payload. For example, a "voice packet" may actually consist of an IP packet, whose payload, formally, is a User Datagram Protocol (UDP) protocol unit, whose payload, formally, is a Real-Time transport protocol (RTP) unit, whose payload, formally, is the set of voice samples. In this example, the "packet payload" will be referred to as the set of voice samples, and the "packet header" will be referred to as the totality of control information contained in all of the protocol units involved, i.e., IP, UDP, and RTP.

Packet 310 travels through packet switching network 303 and reaches packet switching network interface 315. The particular path taken by packet 310 is generally not known in advance and there is no dedicated communication circuit for packet 310. The payload portion 307 usually is filled completely with voice data. Packet 310 is merely illustrative and used to illustrate that there is some type of payload associated with the packet. Note that some Voice over IP systems may not completely fill the payload portion 307. In these cases, the part of the payload portion 307 that is full can be used during a repeat play of a packet and the term "packet" should be construed to include partially filled packets. Such partially filled packets could occur, for instance, if compression is performed on the voice signal. Most, if not all, packets that are transmitted through packet switching networks require some type of header. Generally, the header contains at least a destination address. Other items may be included in the header, depending on the particular packet switching networks. For example Internet Protocol (IP) packets tend to have large headers 305, but the packet lengths are variable to a certain degree, which means that the size of the payload 307 is variable. Conversely, an Asynchronous Transfer Mode (ATM) packet 310 is small, only 53 bytes for a packet is allowed and this packet size is fixed. There are five bytes of header 305, leaving 48 bytes of payload 307.

In this example, the circuit switching network interface 320 actually plays out a packet and creates a synchronous voice signal from the packet. For the circuit switching network interface 320 and the jitter buffer manager 335 to be able to reconstruct a synchronous voice signal, some type of sequencing information is necessary. In other words, the jitter buffer manager 335 must be able to discern that one packet is supposed to be played before (or after) another packet. This sequencing information is generally stored in the header 305. However, packet switching networks may use a portion of payload 307 data to hold the sequencing information. For example, for ATM, generally one byte of payload is used for sequencing information, which leaves 47 bytes for voice data. As discussed above, a timestamp, such as the one provided by the RTP protocol, may be used.

Packet switching network interface 315 receives the packet 310 generally in a serial manner. In other words, if a packet 305 is 1024 bytes long, the packet switching network interface 315 must receive all 8192 bits (1024 bytes multiplied by 8 bits per byte) before packet 310 is received. In the example of FIG. 3, packet switching network interface 315 will collect all bits of the packet 310 then interrupt processor 325 through an interrupt (not shown). Another possibility is that the processor 325 periodically polls the packet switching network interface 315 until a packet arrives. While the packet switching network interface 315 waits for processor 325 to retrieve packet 310, the network interface 315 is receiving additional bits from other packets. Generally, a packet switching network interface 315 can be made to interrupt after one or a few packets are received or even interrupt if a portion of a packet is received. For the sake of simplicity, it is assumed herein that the packet switching network interface 315 collects a single packet 310 and then transfers that packet to the memory 330 as received packet 370.

Figure 4:
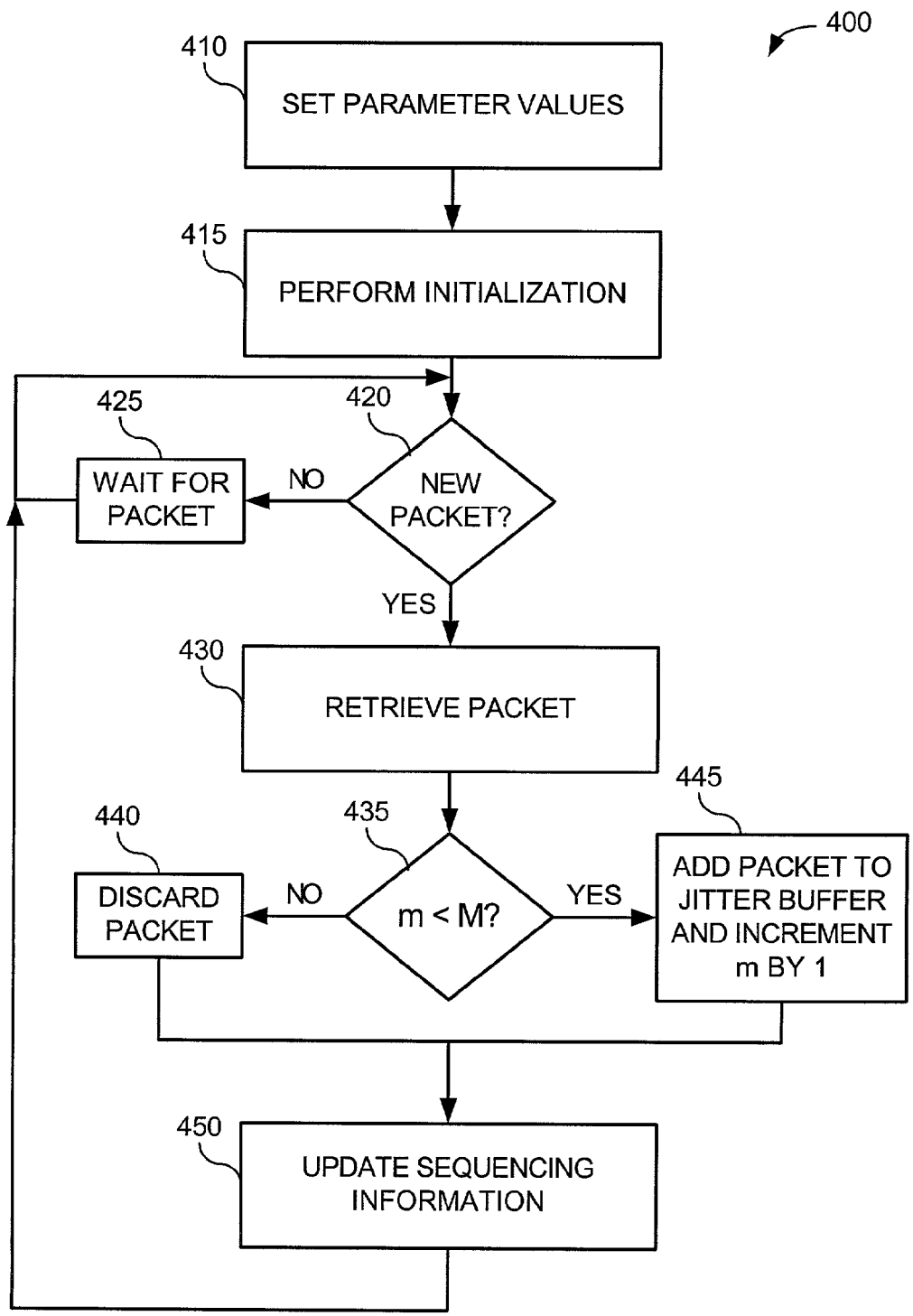
FIG. 4 is a flowchart of an exemplary method for managing a jitter buffer during initialization and while receiving voice packets, in accordance with a preferred embodiment of the invention.
Figure 5:
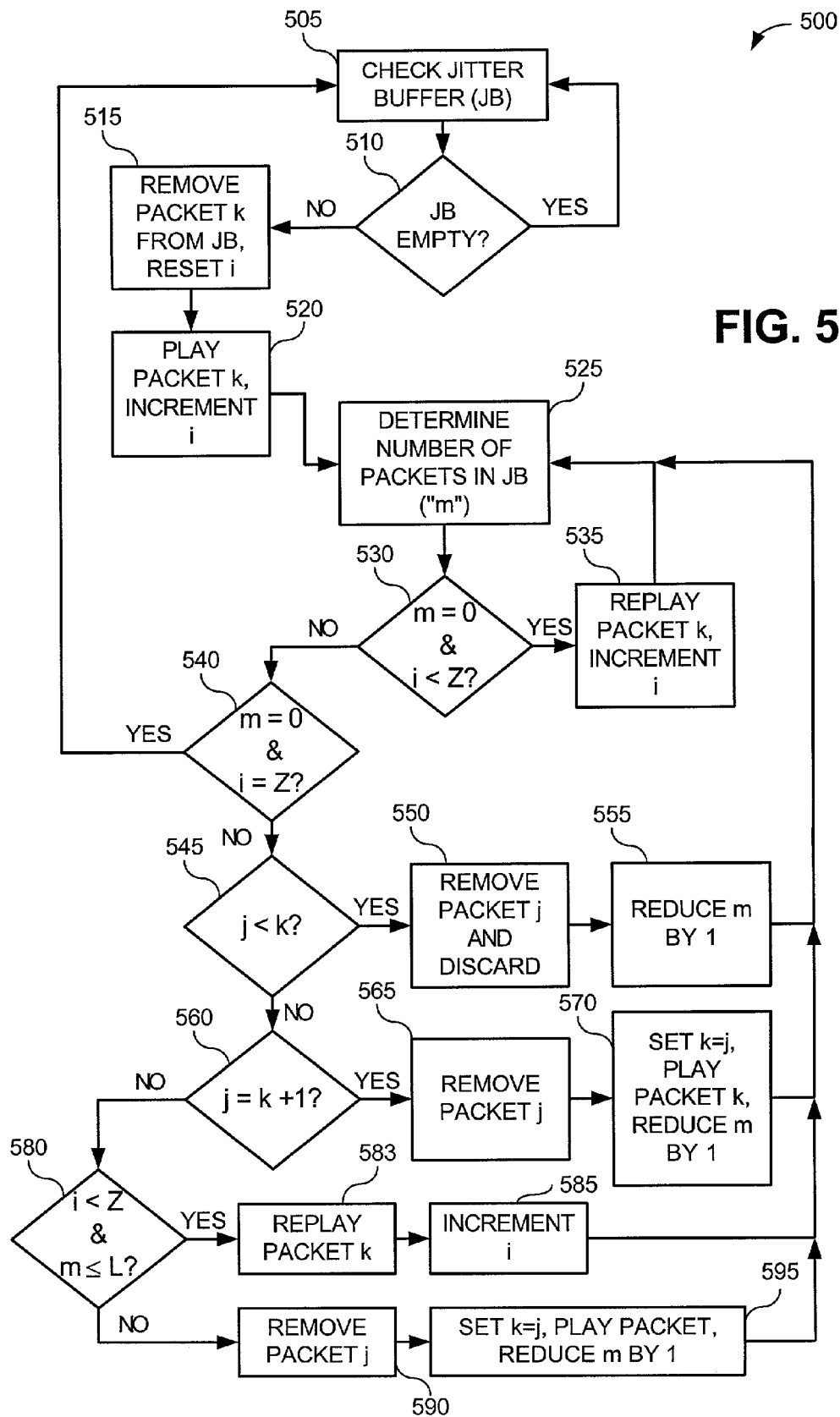
FIG. 5 is a flowchart of an exemplary method for managing a jitter buffer in order to select and playback received voice packets, in accordance with a preferred embodiment of the invention.

Processor 325 executes jitter buffer manager 335, which is a process, shown more particularly in reference to FIGS. 4 and 5, that adjusts packets in the jitter buffer 350 to be able to add to, subtract from, or maintain an implicit jitter buffer delay. To perform these functions, the jitter buffer manager 335 uses parameters 340. Preferred parameters are discussed immediately below, and additional possible parameters are described in the "Additional Embodiments" section. It should be noted that the term "jitter buffer" is commonly used to refer to both the device that manages a memory area for storing packets and the memory area used to store the packets. In the present description, the manager (i.e., jitter buffer manager 335) and memory (i.e., jitter buffer memory 350) will be described as being separated, but there is no reason that these cannot be combined into one device having a memory. For instance, a semiconductor circuit could be made that contains jitter buffer manager 335 and jitter buffer 350 (along with other portions of memory 330).

Preferred parameters 340 are the parameters 340 M, L, and Z. These are control parameters that will limit the maximum number of packets allowed to be simultaneously in the jitter buffer, and will determine under what conditions a packet that has been played out will be made to be played out again.

The parameter M, an integer greater than zero, specifies the maximum number of packets allowed to be simultaneously in the jitter buffer. A possible value for M is 5, but normally this parameter would be determined in accordance with the voice packetization interval, and the possible characteristics of cross-network delays experienced by voice packets.

The parameter Z, an integer greater than zero, is the maximum number of times that any one packet is allowed to be played. Thus, setting Z equal to 1 will prevent packets from being replayed. Generally, Z will be greater than one so that packets can be replayed.

The parameter L, an integer greater than or equal to zero and less than or equal to M, provides another control over the replaying of packets. If m is greater than L (the variable "m" is used to denote the actual number of packets in the jitter buffer at a particular point in time), then the re-playing of the last played packet is completely disallowed, regardless of the number of times that packet has already been played. This means that, when the jitter buffer contents gets close to its maximum allowed value (M), the repeat-playing of packets is turned off. Repeat playing of packets will tend to move the jitter buffer contents closer to its maximum capacity, M, a condition that is to be avoided.

Packet sequencing information 345 contains information about the order of voice packets 355 in jitter buffer 350. For instance, it is possible for a packet to be so delayed that it arrives after a packet that was sent after the first packet. Additionally, packets may be lost and never arrive. The jitter buffer manager 335 determines the packet sequencing information 345 through reference to header 305 information (or payload 307) information and uses the packet sequencing information 345 to play the voice packets 355 in the proper order. The packet sequencing information 345 may also be used to force a playback of a current voice packet. For example, if it is determined through reference to packet sequencing information 345 that a packet is lost, one of the packets in the series that would be played before or after the missing packet may be played twice. It should be noted that packet sequencing information 345 may be stored with packets 355-1 through 355-M, if desired.

Jitter buffer 350 is a memory area used to store a predetermined number of voice packets. The packet being played memory area 360 is used to store the packet that is currently being played, and the circuit switching network interface 320 accesses memory 330 to play out packet 360. It should be noted that the area 360 is not necessary. For instance, the jitter buffer manager 335 can maintain a pointer (not shown) that references the packet 355 that is currently being played and the jitter buffer manager can cause the playout of packet 355. Additionally, the jitter buffer manager 335 may contain another pointer (also not shown) that is used to determine which byte of the packet 355 is next to be output over digital voice data 365. However, the packet being played location 360 will be described herein as being separate from jitter buffer 350 because this description aids understanding. It should also be noted that the jitter buffer 350 may be implemented as a circular buffer, which is a device known to those skilled in the art. A circular buffer is a memory addressable area and it is access through one or more pointers that start at zero and end at (N−1). The first packet is placed into location zero and a pointer is incremented. The next packet is placed into the next memory location and the pointer is incremented. When the pointer would be incremented to N, it is actually incremented to zero. This makes the pointer "travel" in a circle. Additionally, circuit switching network interface 320 could hold the packet being played 360 during playback and any repeated playback.

The circuit switching network interface 320 plays a packet, in memory area 360, by selecting a portion of the packet every predetermined time period and outputting the portion as synchronous voice data 365. The time period, for a voice signal sampled at 64 thousand bits per second, will be 125 microseconds, but other periods may be used. The portions will be selected in an order determined by how they were collected. In other words, if portion A was collected before portion B, portion A should be played before portion B.

As is known in the art, the methods and apparatus discussed herein may be distributed as an article of manufacture that itself comprises a computer system-readable medium having computer system-readable code means embodied thereon. The computer system-readable code means is operable, in conjunction with a device such as circuit switching network interface 320, to carry out all or some of the steps to perform the methods or create the apparatuses discussed herein. The computer system-readable medium may be a recordable medium (e.g., floppy disks, hard drives, memory cards, or optical disks, such as DVD 301, which is accessed through medium interface 317) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer system-readable code means is any mechanism for allowing a computer system to read instructions and data, such as magnetic variations on a magnetic medium or height variations on the surface of a compact disk, such as DVD 301.

Memory 330 configures its processor 325 to implement the methods, steps, and functions disclosed herein. Memory 330 could be distributed or local and the processor 325 could be distributed or singular. Each memory could be implemented as an electrical, magnetic or optical memory, or any combination of these or other types of storage devices. Moreover, the term "memory" should be construed broadly enough to encompass any information able to be read from or written to an address in the addressable space accessed by a processor 325. With this definition, information on a network (e.g., wired network 270 or a wireless network) is still within a memory, such as memory 330, because the processor, such as processor 325, can retrieve the information from the network. It should be noted that each distributed processor that makes up a distributed processor generally contains its own addressable memory space. It should also be noted that some or all of gateway 300 can be incorporated into an application-specific or general-use integrated circuit. Specifically, any part of gateway 300 can be made into an integrated circuit through techniques known to those skilled in the art. For example, jitter buffer manager 335 can be formed as part of a functional block of circuitry. The parameters 340, packet sequencing information 345, jitter buffer memory 350, and packet memory 360 can be formed on the same integrated circuit as jitter buffer manager 335.

FIG. 3 also presents an example of another location where the techniques of the present invention may be used. For instance, the gateway 300 could be a personal computer, processor 325 could be a single or multiple processor and the processor 325 and memory 330 could be implemented as part of medium interface 317. In this embodiment, jitter buffer manager 335 will be used to store audio or video from DVD 301 during playback (or writing) and will, therefore, buffer this information. The jitter buffer 350 can then become an appropriate amount of memory, based on the throughput needed for the operations involving the DVD 301. It may be beneficial, in this case, to reduce or eliminate repeat playback of "packets" of information from the DVD 301. However, repeat playback of packets may not be detrimental. For instance, a repeat playback of part of or even a complete frame of video may not be discernable.

The present invention has applications beyond voice signals and really has applicability for any asynchronously delivered information where the information is separated into distinct sections.

Turning now to FIG. 4, a flowchart is shown of an exemplary method 400 for managing a jitter buffer during initialization and while receiving voice packets. Method 400 is performed by a jitter buffer manager 335 or other similar device. Prior to receiving any packets at the destination (the location of the jitter buffer), the following set up is performed. In step 410, parameters, M, Z, and L, are set to their chosen values. These values will generally be determined by an administrator and loaded into the gateway 320 (see FIG. 3) through a remote accessing scheme. In step 420, the system is initialized. In particular, the variable m, which is the number of packets in the jitter buffer at any given time, is set to zero. Other initialization can occur in step 420, such as initializing memory and resetting various hardware devices.

Steps 420 and 425 are basically steps of a loop that waits until a packet is received. In step 420, it is determined if a packet is received. If no packet is received (step 420 is equal to NO), then the system waits for a packet to be received (step 425). There are a number of different techniques that may be used to determine if a packet is received. For instance, in the example of FIG. 3, the packet switching network interface 315 can interrupt the processor 325 when a packet has been received. There are other methods, such as polling, that may be used.

Rules for placing received voice packets into the jitter buffer are as follows. When a packet has been received (step 420 is equal to YES), the packet is retrieved (step 430). Step 430 is optional. In step 435, it is determined if m is less than M, which means that the number of packets currently in the jitter buffer is less than the maximum allowed number of packets. If so (step 435 is equal to YES), place the received packet in the jitter buffer and increment m by one (step 445). However, if m is equal to M (step 435 is equal to NO), discard this just-received packet (step 440), as there is no room left in the jitter buffer. To discard the just-received packet, if the packet was placed in the jitter buffer, the packet may be overwritten with another packet or a reference that indicates the current location in the jitter buffer may be adjusted to point to the previously received packet. Additionally, there may be an option for a network interface to delete the received packet.

In step 450, sequencing information is updated. As discussed above, along with each packet in the jitter buffer, packet sequencing information is maintained, allowing the relative playout order of all the packets, as well as whether or not there are packets missing in the packet sequence, to be determined. This information is updated in step 450.

FIG. 5 is a flowchart of an exemplary method for managing a jitter buffer in order to select and playback received voice packets. Method 500 is also performed by a jitter buffer manager 335. In step 505, the jitter buffer is checked. If the jitter buffer is empty (step 510 is equal to YES), the system waits until the jitter buffer has a packet in it. If the jitter buffer is not empty (step 510 is equal to NO), the packet with the lowest sequence number is removed from the jitter buffer and the variable i, which keeps track of how many times a packet has been played, is reset (step 515). In step 520, the packet k is played out and the variable i is increased. The variable k is used to indicate the current packet that is selected to be played out. In the example of method 500, the packet k is described as being taken out of the jitter buffer. However, there is no requirement that the packet k actually be taken out of the jitter buffer. It is possible that a device suitable for playing out packet k may directly access the jitter buffer and play out packet k while leaving packet k in the jitter buffer.

When this playout of packet k has finished, the jitter buffer is checked (step 525), and m packets will be found. If m is equal to 0 and i is less than Z (step 520 is equal to YES), packet k is replayed (step 535) because there is nothing in the jitter buffer to play, and packet k has been played less than the allowed maximum number of times, as defined by the parameter Z. The variable i is incremented in step 535.

If m is equal to 0 and i is equal to Z (step 530 is equal to NO and step 540 is equal to YES), then there is nothing in the jitter buffer to play, and packet k has already been played the maximum number of times (Z). The method 500 continues in step 505, where the method waits until another packet enters the jitter buffer.

If m is greater than 0 (step 540 is equal to NO), this means that there is a "new" packet that might be able to be played out, as m is greater than zero. There is a lowest-sequence-numbered packet in the jitter buffer, which will be called j. If j is less than k (step 545 is equal to YES), the packet j is removed from the jitter buffer and discarded (step 550). This packet should not be played, because packet k, which is greater than j, has already been played. The variable m is reduced by one (step 555) and the jitter buffer is re-checked (step 525). In other words, the packets j and k have particular sequence numbers, such as timestamps, assigned to them. When the sequence number assigned to the packet j is less than the sequence number assigned to the packet k (step 545), then playing packet j would result in playing a packet out of sequence. For example, if the packet j was created at time A and packet k was created at time B, where A is before B, and packet k has already been played at least once, then playing packet j once packet k has already been played will be playing packets out of order. For brevity, the variables "j" and "k" are used to represent both packets and sequence numbers in the steps of method 500. It should also be noted that "j<k" implies that packet j occurs in a sequence before packet k, not necessarily that the actual numbers used to denote sequence information for packets j and k will meet the criteria "j<k." In other words, it is possible to create a numbering scheme where packets are numbered with high numbers if they are at the beginning of a sequence and with low numbers if they are at the end of a sequence. In this situation, packet j may have a sequence number of 1000, for example, but will occur in a sequence before packet k, which has a sequence number of 999, for instance.

If j is equal to k+1 (step 545 is equal to NO), the packet j is removed from the jitter buffer (step 565) and k is set equal to j, the packet k is played, and m is reduced by one (step 570). Steps 565 and 570 should happen most of the time, as packet j is the next packet in the sequence, following packet k, that should be played.

If j is greater than k+1, i is less than Z, and m is less than or equal to L (step 580 is equal to YES), the packet j is not removed from the jitter buffer, but instead packet k is replayed (step 583) and the variable i is incremented (step 585). In this, the variable L is used to indicate the maximum number of packets that can be placed into the jitter buffer. Packet j is not the next packet in sequence, following packet k, and, since i is less than Z and m is less than or equal to L, packet k is allowed to be played at least one more time, increasing the chances that packet k+1 will arrive before packet k is no longer allowed to be played.

If j is greater than k+1 and either i is greater than or equal to Z or m is greater than L, which means that step 580 is equal to NO, the packet j is removed from the jitter buffer (step 590) and k is set to j, the packet k is played, and m is reduced by one (step 595). Although packet j is not the next packet in sequence, following packet k, the number of times packet k has already been played and/or the contents of the jitter buffer prevents packet k from being played again. In other words, if i is equal to Z, then packet k has been played the maximum number of allowed times. It should not be played anymore. Consequently, even though packet j is not the next packet in sequence, it should be played to prevent playing packet k again. Also, if m is greater than L, repeat playback of packets is defeated. Even though packet j is not the next packet in sequence, it should be played to reduce the chance that the jitter buffer will be filled.

Note that in the above there is no concept of a "target" jitter buffer delay per se. The amount of delay that packets experience waiting in the jitter buffer depends on the above decisions and the statistical properties of the network influencing which of the above decisions are taken. The above scheme results in packets being discarded at the jitter buffer if either (i) the jitter buffer is at its maximum, M, when a packet arrives, or (ii) as a result of very different delays experienced by packets, a packet is on the verge of being played out-of-sequence. Also, the above scheme results in packets being repeat-played. The most probable reason for a repeat-playing is condition where the jitter buffer is depleted. However, it is also possible that a packet will be repeat-played if the next packet has been lost or delayed in the network. The parameter Z prevents any given packet from being repeat-played too many times, and the parameter L also inhibits repeat-playing of packets when the jitter buffer is becoming too full. A full jitter buffer is to be avoided because it leads to received packets that have to be dropped.

FIGS. 6 through 9 depict possible jitter buffer dynamic behaviors when at least some of the foregoing techniques have been implemented. In these examples, the parameter L has been set equal to 0. This inhibits repeat-playing of packets whenever there is at least one packet in the jitter buffer that can be played. That is, a packet that is found to be missing, either because it was lost in the network or because it was discarded after arriving at a full jitter buffer, will not by itself cause any packet to be repeat-played. Repeat-playing of packets only occurs if the jitter buffer is empty. In all of these figures, the packetization interval is 10 ms.

Figure 6:
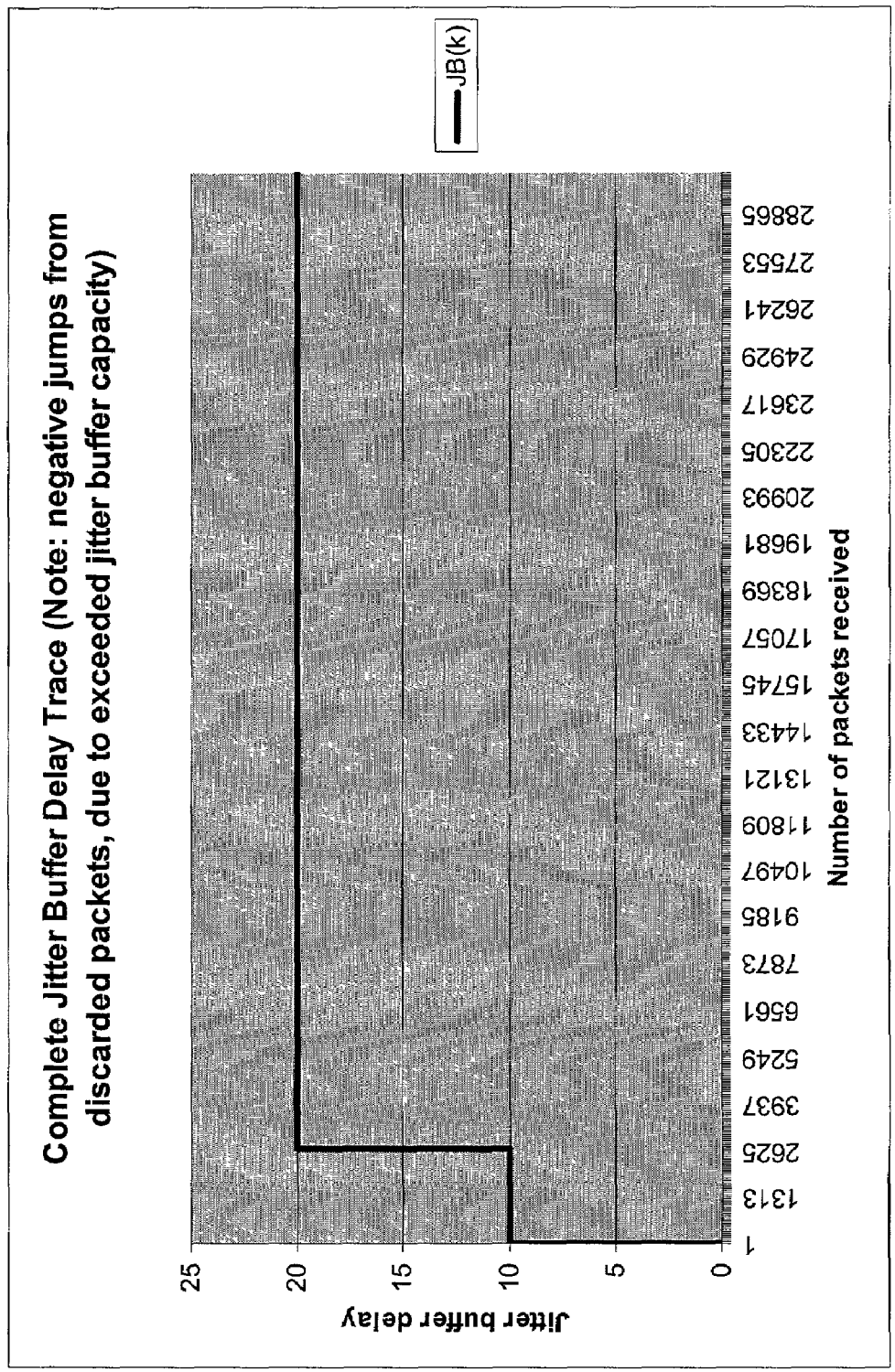
FIGS. 6 through 8 are examples of jitter buffer delay traces for small end-to-end packet delays and for certain parameter selections.

FIG. 6 illustrates a situation where the average end-to-end packet delay is fairly small, and where the parameter M (the maximum allowed number of packets in the jitter buffer) has been set to the value 8. Although the jitter buffer delay begins at zero value, very quickly (after the first several packets), the jitter buffer is found to be empty, and a packet is repeat-played. This causes the jitter buffer delay to "jump" to the value 10 ms. Some time later, around the occurrence of packet number 3000 (this occurs 30 seconds into the voice call), the jitter buffer is again found to be empty, and another packet is repeat-played. This causes the jitter buffer delay to jump to the value 20 ms. This jitter buffer delay value is large enough, in this example, so that, from that point in time onward, the jitter buffer is no longer found to be empty. Effectively, the jitter buffer delay has "stabilized" at the value of 20 ms.

Figure 7:
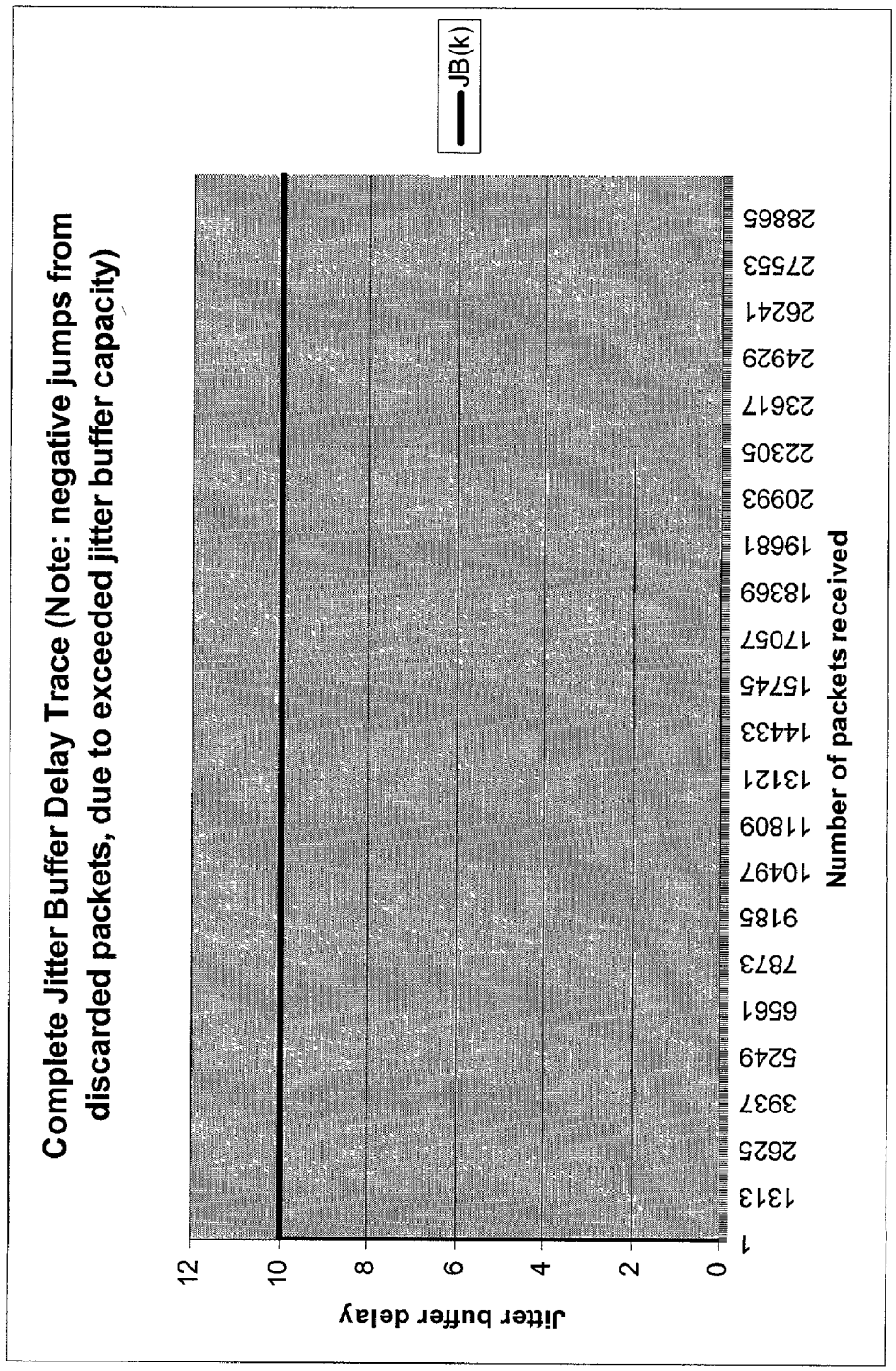

FIG. 7 illustrates the exact same situation as in FIG. 6, but depicts a different random realization. In this case, after the first very quick jump to 10 ms, from that time on, and for the duration of the call, no further packet arrival finds the jitter buffer empty. Thus, in this example, the jitter buffer delay stabilizes at the value of 10 ms. FIGS. 6 and 7 illustrate the two most prevalent situations that would occur for voice calls in this particular network environment—for some calls the jitter buffer delay would stabilize at 10 ms, and for almost all the others the jitter buffer delay would stabilize at 20 ms.

Figure 8:
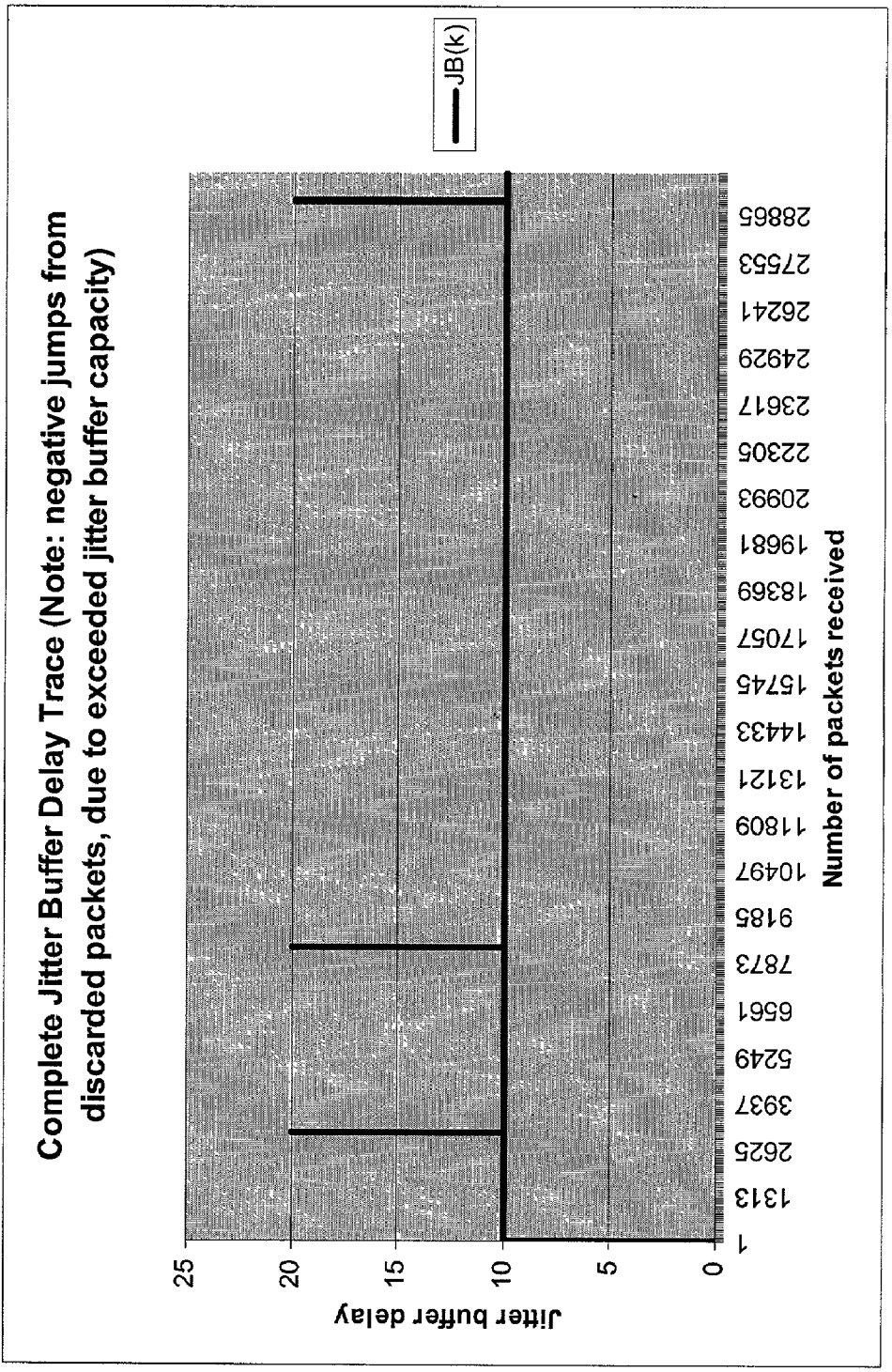

If, in addition, the parameter M were set to the value 2, a dynamic behavior as illustrated in FIG. 8 occurs. The jitter buffer delay almost immediately jumps to the value of 10 ms. On a few occasions thereafter, the jitter buffer is found to be empty at a packet arrival, and the jitter buffer delay jumps to 20 ms. However, very quickly after such a jump to a jitter buffer value of 20 ms, which tends to make the jitter buffer full most of the time, a subsequent packet arrives to a full jitter buffer, and is discarded. This reduces the jitter buffer delay to a value of 10 ms, and because the jitter buffer remains non-empty shortly thereafter, and because L=0, this discarded packet does not cause a repeat-played packet. Thus, the jitter buffer delay tends to stabilize at the value of 10 ms with these parameter settings.

Figure 9:
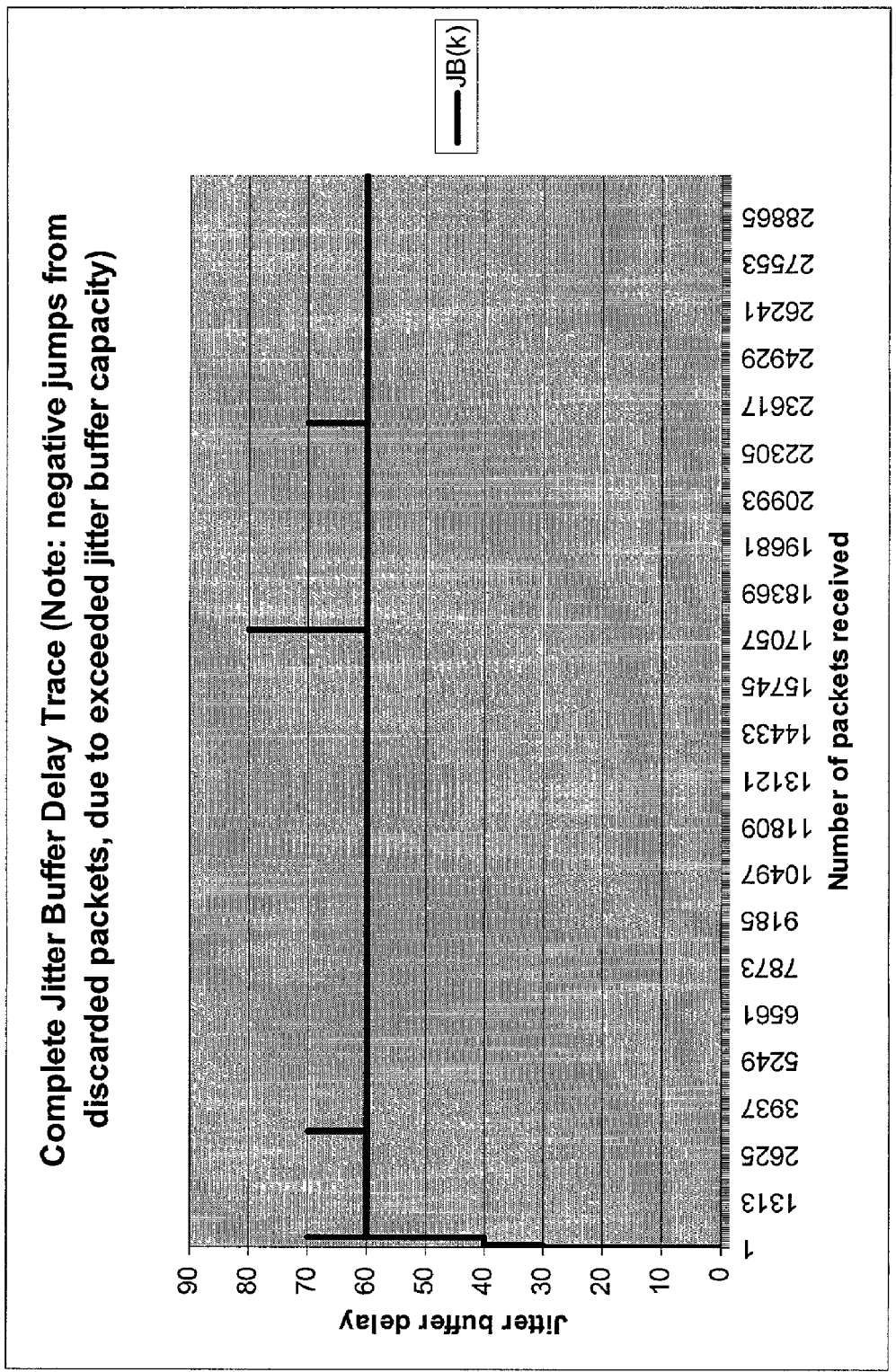
FIG. 9 is an example of a jitter buffer delay trace for large end-to-end packet delays.

Finally, FIG. 9 illustrates a situation where the average end-to-end packet delay is larger (and where the parameter M is again set to the value 8). Almost immediately, at the start of the voice call, the jitter buffer is found to be empty, and three repeat-playings of packets, in fairly rapid succession, cause the jitter buffer delay to jump quickly to the value 30 ms. Very quickly thereafter, two additional repeat-playings push the jitter buffer delay to the value 50 ms. From that point onward, FIG. 9 illustrates the occurrence of a few more repeat-playings of packets, but also each of these being quickly compensated for by packet discards, as was previously illustrated in FIG. 8. The jitter buffer delay takes brief excursions up to the value of 70 ms, and even to 80 ms, but tends to stabilize in the vicinity of 60 ms. In the entire duration of the voice call, in this example, eleven repeat playings and five discards of packets have occurred.

ADDITIONAL EXEMPLARY EMBODIMENTS

Potential choices for the parameters M, L, and Z are as follows: M is equal to 5 to 7; L is equal to M minus 2; Z is equal to 2 or 3. Other choices may be selected, but these are common selections.

There may be situations where a predetermined explicit jitter buffer delay is beneficial. For instance, sometimes silence suppression is used. In a silence suppression system, no voice data is collected for silence. Consequently, there will be "talk spurts" that contain voice data, and then no voice data. For silence suppression, the jitter buffer manager might repeat play a few times every time there is a talk spurt. A non-zero jitter buffer delay might be needed instead of repeat playing out the first packet. Also, eventually the last packet would get played out. There is generally some protocol to say "That was the last packet in the talk spurt." Without this capability, the jitter buffer manager of the present invention would play out the last packet, for up to whatever the limit, Z, is. This might become annoying. Having a protocol that allows the last packet in a voice spurt to be determined will obviate playing the last packet multiple times.

Also, it should be noted that methods 400 and 500 can be combined into one method.

There is also the possibility that partial playback of a packet may be used during repeat play instead of a whole packet. Illustratively, for high speed networks where the time to play out a packet is much longer than the time to transmit packets, it might be useful to select some portion of a packet for repeat play and then play out this portion. For example, if it takes 10 ms to play out a packet, 20 percent of a packet could be selected for repeat playout. This 20 percent would yield an effective jitter buffer delay increase of 1 ms. The first 20 percent, the last 20 percent, or every fifth data item in the packet could be selected as the portion of the packet to use during repeat playback of the packet. If the packet would have to be repeated, a different portion or the same portion could be played back.

It is to be understood that the embodiments and variations shown and described herein are merely illustrative of the principles of this invention and that various modifications may be implemented by those skilled in the art without departing from the scope and spirit of the invention. Thereby or whereby clauses in the claims should be considered non-limiting.

I claim:

1. A method for jitter buffer delay management, the method comprising the steps of:

receiving a received packet;

when there are no packets in a buffer, performing the following steps:

playing the received packet, the step of playing performed without waiting an explicit delay;

determining, after the received packet is played, if there are any new packets in the buffer;

replaying only a portion of the received packet when there are no new packets in the buffer, the step of replaying thereby increasing an implicit delay; and when there is at least one packet in the buffer and a number of packets in the buffer is below a predetermined value, performing the following steps:

placing the received packet in the buffer;

determining if the received packet should be played before a current packet; and discarding the received packet when the received packet should be played before a current packet.

2. The method of claim 1, further comprising a step of discarding a received packet by never placing the received packet in the buffer.

3. The method of claim 1, wherein the steps of determining if there are any new packets in the buffer and replaying can be performed multiple times, and wherein the step of when there are no packets in a buffer, performing the following steps, further comprises the steps of determining if the received packet has been played a predetermined number of times, and not replaying the received packet when the received packet has been played a number of times.

4. The method of claim 1, wherein the step of determining if the received packet should be played before a current packet further comprises the steps of determining timestamps for each of the received packet and current packet and using the timestamps to determine if the received packet should be played before a current packet by determining which packet of the received and current packets was created first.

5. The method of claim 1, wherein the step of determining if the received packet should be played before a current packet further comprises the steps of determining sequence numbers for each of the received packet and current packet and using the sequence numbers to determine if the received packet should be played before a current packet by determining which packet of the received and current packets was created first.

6. The method of claim 1, wherein the step of when there is at least one packet in the buffer and a number of packets in the buffer is below a predetermined value. placing the received packet in the buffer further comprises the steps of:

determining if a current packet has been played less than a predetermined number of times;

determining sequences for the received packet and the current packet;

determining if the number of packets in the buffer is less than a second predetermined value;

replaying a current packet when the current packet has been played less than the predetermined number of times, the current packet should be played before the received packet according to the sequences, and the number of packets in the buffer is less than the second predetermined value; and playing the received packet when the current packet should be played before the received packet according to the sequences and either the current packet has been played more than the predetermined number of times or the number of packets in the buffer is less than the second predetermined value.

7. A method for jitter buffer delay management, the method comprising the steps of:

determining a number of packets currently in a buffer;

selecting, based on the settings for a buffer limit value, a replay value, a repeat play value, and the number of packets currently in the buffer, one of the steps of (i) playing a packet from the buffer, (ii) replaying a previously played packet from the buffer, (iii) discarding a packet from the buffer, (iv) selecting another packet from the buffer, and (v) waiting for another packet to be put in the buffer; wherein the replay value indicates a maximum number of times a particular packet is allowed to be replayed and wherein the repeat play value indicates a maximum number of packets currently in said buffer above which replaying of packets is disallowed; and performing the selected step of steps (i) through (v).

8. The method of claim 7, further comprising the steps of:

setting the buffer limit value the buffer limit value indicating a maximum number of packets allowed in a buffer;

setting the replay value, the replay value indicating a maximum number of times a particular packet is allowed to be replayed; and setting the repeat play value, the repeat play value indicating a packet level above which replaying of packets is disallowed.

9. The method of claim 8, further comprising the steps of:

receiving a received packet;

determining whether the received packet should be placed into the buffer; and discarding the received packet when it is determined that the received packet should not be placed into the buffer.

10. The method of claim 9, wherein:

the step of determining whether the received packet should be placed into the buffer comprises the step of determining whether the number of packets in the buffer is equal to the buffer limit value; and the step of discarding the received packet when it is determined that the received packet should not be placed into a buffer comprises the step of discarding the received packet when it is determined that the number of packets in the buffer is equal to the buffer limit value.

11. The method of claim 8, wherein:

step (i) is selected when there is at least one packet in the buffer, one of the at least one packets has not been previously played, and the one packet is next in a sequence;

step (ii) is selected either when the buffer is empty and a number of times a current packet has been played is less than the replay value or a number of packets in the buffer is less than the repeat play value and a next packet in the sequence is not in the buffer;

step (iii) is selected when the number of packets in the buffer is equal to the buffer limit value or when a received packet occurs earlier in the sequence than a current packet;

step (iv) is selected when there is at least one packet in the buffer and when a received packet occurs earlier in the sequence than a current packet; and step (v) is selected when the buffer is empty and a previously played packet has been played a number of times equal to the replay value.

* * * * *